United States Patent
Rodriguez et al.

(10) Patent No.: US 10,086,575 B2
(45) Date of Patent: Oct. 2, 2018

(54) SMOOTHING OF 3D PRINTED LENSES

(71) Applicant: Indizen Optical Technologies of America, LLC, Torrance, CA (US)

(72) Inventors: Diego Rodriguez, Madrid (ES); José Alonso Fernández, Madrid (ES); Juan Antonio Quiroga, Madrid (ES); Daniel Crespo Vázquez, Rancho Palos Verdes, CA (US)

(73) Assignee: Indizen Optical Technologies of America, LLC, Torrance, CA (US)

( * ) Notice: Subject to any disclaimer, the term of this patent is extended or adjusted under 35 U.S.C. 154(b) by 333 days.

(21) Appl. No.: 14/879,465

(22) Filed: Oct. 9, 2015

(65) Prior Publication Data

US 2017/0100903 A1    Apr. 13, 2017

(51) Int. Cl.
| | | |
|---|---|---|
| *B29D 11/00* | (2006.01) | |
| *B29C 67/00* | (2017.01) | |
| *B29K 33/00* | (2006.01) | |
| *B29K 105/00* | (2006.01) | |
| *B29K 667/00* | (2006.01) | |
| *B33Y 10/00* | (2015.01) | |
| *B33Y 80/00* | (2015.01) | |

(52) U.S. Cl.
CPC .. *B29D 11/00432* (2013.01); *B29D 11/00009* (2013.01); *B29D 11/00442* (2013.01); *B29C 67/0066* (2013.01); *B29K 2033/08* (2013.01); *B29K 2105/0002* (2013.01); *B29K 2105/0058* (2013.01); *B29K 2667/003* (2013.01); *B33Y 10/00* (2014.12); *B33Y 80/00* (2014.12)

(58) Field of Classification Search
CPC ........ B29D 11/00432; B29D 11/00009; B29D 11/00442; B29C 67/0066
See application file for complete search history.

(56) References Cited

U.S. PATENT DOCUMENTS

| | | |
|---|---|---|
| 5,435,943 A | 7/1995 | Adams et al. |
| 5,858,163 A | 1/1999 | Wood et al. |
| 2002/0196408 A1 | 12/2002 | Bhalakia et al. |
| 2007/0138666 A1 | 6/2007 | Chen et al. |
| 2007/0138667 A1 | 6/2007 | Dang et al. |
| 2009/0291206 A1 | 11/2009 | Jiang |
| 2010/0193112 A1* | 8/2010 | Bovet ................ B29C 63/0073 156/196 |

OTHER PUBLICATIONS

World Intellectual Property Organization, International Search Report and Written Opinion for International Application No. PCT/2016/056118, dated Dec. 23, 2016, 12 total pages.

* cited by examiner

*Primary Examiner* — Mathieu Vargot
(74) *Attorney, Agent, or Firm* — SoCal IP Law Group LLP; Mark Andrew Goldstein

(57) ABSTRACT

Systems and methods for smoothing a lens are disclosed herein. A monomer used to make or augment the lens according to an additive method is deposited on the lens surface to be smoothed. A film or membrane with certain elastic properties is pressed against the layered (stepped) surface, with the monomer in between the lens and the membrane. The pressure of the membrane spreads the monomer over the surface of the lens, filling the spaces between the layered (stepped) surface and the membrane. A curing agent is applied to transition the monomer into a polymer coating matching the curve of the membrane. The membrane is removed, leaving a clean, smooth lens surface.

21 Claims, 7 Drawing Sheets

US 10,086,575 B2

SMOOTHING OF 3D PRINTED LENSES

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to the making of ophthalmic lenses and in particular to methods of improving the quality and smoothness of the surfaces of eyewear lenses made by using additive techniques, and the products obtained therefrom.

Description of the Related Art

Prescription eyewear lenses are used to correct refractive errors of human vision. Eyewear lenses may be used for protection, namely to protect the eyes from excess light or from a mechanical, chemical or biological hazard.

Two main technologies are used to shape the surfaces of eyewear lenses. One shaping technology is molding. With molding, a reference surface is made in glass or other material, and the reference surface is replicated on the eyewear lens by mold casting or by injection molding. The other shaping technology is grinding and polishing, where a solid piece of optical material is mechanically ground (or milled) and polished until the required surface is obtained.

Prescription eyewear lenses are characterized by the huge number, virtually infinite, of possible different lenses that can be potentially made. Lenses can be different in regard lens material, modifiers embedded in the lens, coatings, power and power distribution. Optical power is typically delivered in steps of 0.25 D. This sets a limit in the number of different optical powers that could be potentially used. Nevertheless, modern digital lenses available since around 2000 may be tailored to the user's characteristics or needs, taking into account the actual position of the lens with respect to the eye. As a consequence, the optimization of the optical performance of the eyewear lens for each individual requires the capacity of producing lenses with arbitrarily any optical power. Similarly, multifocal eyewear lenses used primarily for presbyope individuals have a continuous variation of power across the lens aperture. This power variation allows the user to sharply focus at different distances. Once again, the number of different power distributions in these multifocal lenses is virtually infinite.

Modern digital grinding (milling) and polishing technology may be used to produce arbitrary surfaces. In this way it is well suited for making eyewear lenses with the required shape variability. However, mechanical grinding and polishing is a subtractive process that requires complex and expensive machinery to guarantee the accuracy level required for eyewear products. Mechanical grinding and polishing requires expensive tooling and equipment for proper alignment. Mechanical grinding and polishing uses expensive consumables including cutting tools, polishing slurries, polishing pads, and coolants. Plus, mechanical grinding and polishing is an energy consuming process that also produces a lot of waste, which is difficult to handle and eliminate.

Molding is not a subtractive method, but it requires the previous manufacturing of the mold itself. When the number of required lens surfaces is too numerous, molding becomes unpractical because the number of lens surfaces molded (or cast) from each mold are too low in number, resulting in a large number of molds that must be produced and kept on hand.

Up to now, the optical industry has employed a hybrid method combining molding and mechanical techniques. This hybrid method is possible thanks to the additive nature of optical power. A lens element has two polished surfaces, and its optical power can be distributed between the two surfaces. This way, one of the surfaces can be normalized to a relatively small number of different shapes, which are made by molding, and the other surface is ground/polished to a shape required to obtain the desired optical power and optical power distribution. This way, the manufacturing of eyewear lenses is split in a two-step process. First, semi-finished lens blanks are produced by casting or injection molding. A lens manufacturer buys and stores these blanks, or produces the blanks. Second, when a lens manufacturer receives a lens order, an appropriate lens blank is selected and the back surface of the blank is mechanically figured to create the requested lens.

The customized nature of eyewear lenses makes them ideal products for a more distributed and simple manufacturing process. An improved additive process for eyewear lens preparation would be beneficial. The lenses could be made on demand which has multiple benefits. Custom manufacturing lenses using an additive process removes the need to produce and store semi-finished blanks, eliminates material waste inherent in grinding, and reduce overall energy consumption by simplifying the overall process. Also, additive manufacturing allows for the adding or embedding structures for upcoming technologies inside the lens including using mirrors, prisms, micro-lenses, diffraction gratings, light sources, and other techniques.

Figure 1:
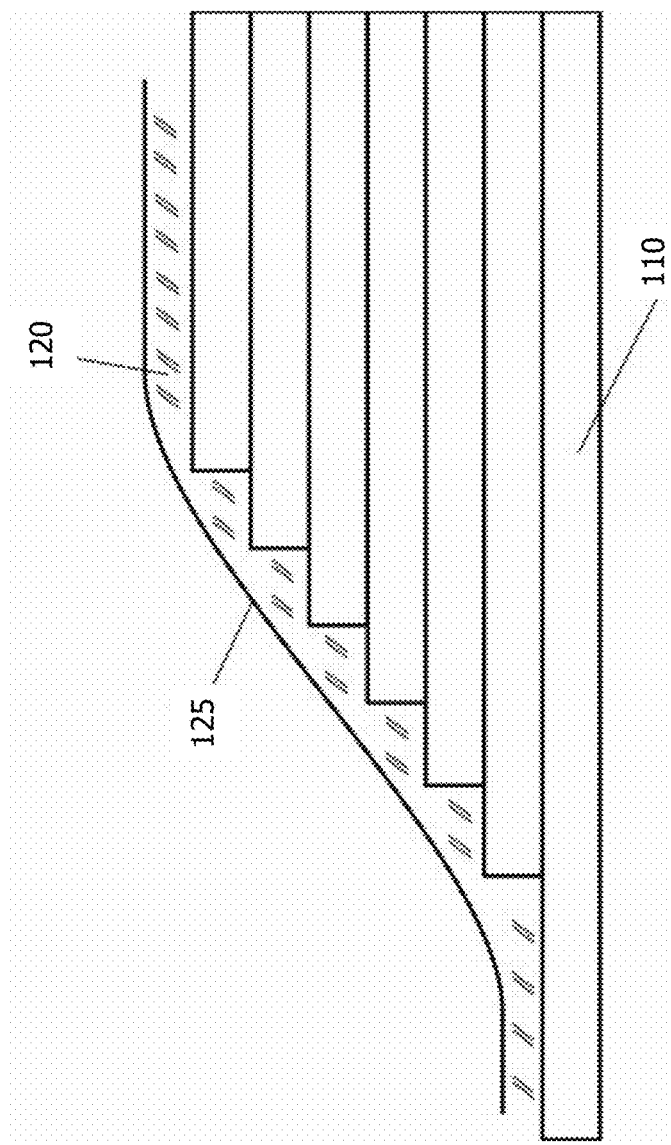
FIG. 1 is a block drawing in profile showing the smoothing of a stepped lens surface.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

An effective and innovative approach to improve the quality of 3D printed lens surfaces incorporating a simple and efficient post-processing method is described herein. Systems and methods for smoothing stepped lenses are described herein.

The lenses described below and shown in the drawings can be made in any suitable shape and geometry by an additive manufacturing process. Stereo lithography (SLA) is a commonly used method. SLA can be adapted to different growing strategies, can be used on top of different growing platforms and/or substrates, and is fast. Some lenses include two parts, one made by any process, not necessarily additive, and the other made using an additive process that generates layers and/or voxels that produce a stepped surface. In addition, some lenses may be comprised of layers of lenses produced by both traditional and additive processes. It is the stepped surface that results from the additive process that the systems and methods described herein are suitable. The systems and methods described herein are particularly suitable for prescription eyewear and ophthalmic lenses but may also be used for improving any lenses made by an additive process.

The systems and methods described herein may be applied to lenses having any kind of geometry with at least one of the surfaces having a stepped profile. In some situations, the systems and methods may be applied simultaneously or sequentially to the front and back surfaces of a lens. The lenses may have a concave surface and a convex surface. In practice, the lens is typically placed in an eyeglass frame with the concave surface closest to the eyeglass wearer's eye. Either or both surfaces, concave or convex, may have a stepped profile.

The lenses may be produced with the contour of the frame it will be put in, and optical and ergonomic criteria can be taken into account during lens design. The systems and methods described herein have as a prerequisite that the optimum surfaces—arc, curvature, and the like—of the lens have been computed and properly described according to techniques known to those skilled in the art. The lenses to which the systems and methods described herein are used have surface layering that has been computed to optimize lens shape and to compensate for material shrinkage and for the possible surface shifting/deformation caused by the smoothing methods disclosed herein.

Referring to FIG. 1, a block drawing in profile showing the smoothing of a stepped lens surface is shown. A layered surface of the lens 110 was produced using an additive process. The layered (stepped) profile is an approximation to the desired surface. In an ideal scenario where the layering process has neither mechanical nor geometrical errors, and there is no shrinkage/warpage of the monomer during the polymerization process, the layered surface profile would be a simple discretization of the surface height, at constant or variable steps. In practice, there are mechanical and/or geometrical errors. In addition, the monomer used to create the layers (steps) during the additive process shrinks as it polymerizes causing warping. These factors can be measured, characterized and compensated. The layered (stepped) surface resulting from the additive 3D printing process is the stepped profile. The systems and methods described herein are used to better match the desired surface. The layered surface on lens 110 is not valid as an optical surface. The systems and methods described herein provide a solution. However, the systems and methods described herein cannot smooth lenses with very big steps such as those greater than 0.1 mm in size, such as, for example, those in traditional bifocal lenses.

Figure 2:
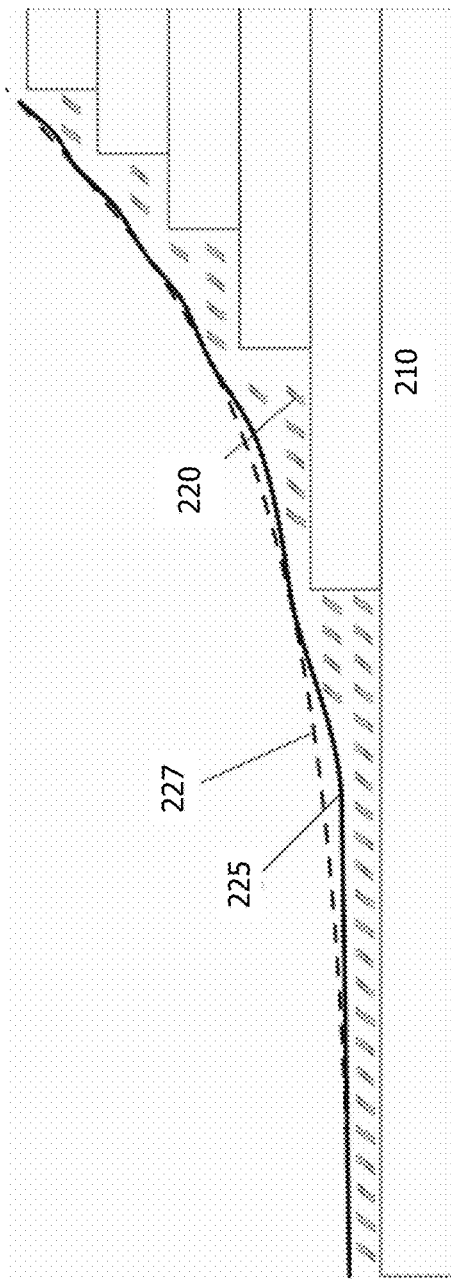
FIG. 2 is a block drawing in profile showing problems inherent in the smoothing of a stepped lens surface.

Post-processing smoothing using surface melting by temperature or a solvent, and dip coating rely on the natural minimization of the energy of the fluid layer. However, the typical result obtained with this type of smoothing is shown in FIGS. 1 and 2. The actual surface of the liquid monomer layer 120 and 220 smooths the sharp edges of the steps of the lens 110 and 210, but presents a basic curve 125 at best but more typically conforms to the shape and position of the steps as shown by element 225. The result includes strong curvature variations that make the surface unpractical and unusable as an optical lens. The variations are shown by the comparison of resulting surface 225 with the desired arc 227 in FIG. 2.

Figure 3:
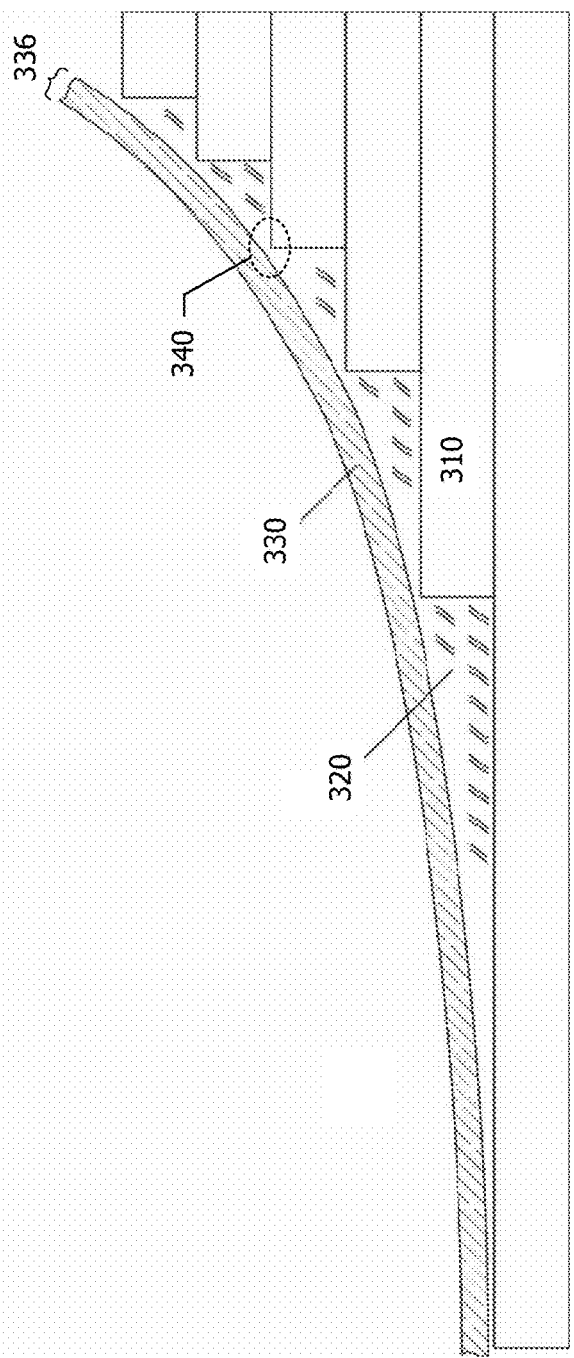
FIG. 3 is a block drawing in profile showing the preferred result of smoothing of a stepped lens surface.

Referring now to FIG. 3, a block drawing in profile showing a preferred result of smoothing of a stepped lens surface according to the methods described herein is shown. According to the methods described herein, a film or membrane 330 of a partially elastic material is pressed against the stepped profile of the lens 310. A predetermined quantity of liquid monomer 320 is applied between the lens 310 and the membrane 330. Although this disclosure refers to a monomer in many locations, other polymerizable liquid materials may be used. The polymerizable liquid material is a monomer, oligomer, or prepolymer which can be cured to a solid transparent polymer in response to application of UV light or other curing agent. The polymerizable liquid materials include monomers, oligomers, polyester resins, acrylic resins, and epoxy resins.

The membrane 330 is selected having a thickness and elastic properties so that it can adapt to the shape of the stepped surface of the lens 310 and be thick enough so as not to deform around the edges of the steps of the lens 310. The thickness is shown as element 336. The membrane 330 may be polyethylene terephthalate (PET), polyurethane resin, silicone or other suitable films. The film may be disposable or reusable. In one embodiment, the film is silicone having a thickness of between 200 and 500 microns to allow for elasticity and durability. The amount of liquid monomer 320 applied between the stepped surface of the lens 310 and the membrane 330 is selected so that all the gaps between the stepped surface of the lens 310 and the membrane 330 are filled with monomer 320. The viscosity of the monomer 320, the thickness and elastic properties of the membrane 330 and the pressure (described below) that holds the membrane 330 against the stepped surface are chosen so that a small amount of monomer stops the membrane from actually touching the edges of the steps. This is shown by the space 340 between the membrane 330 and lens 310 that is filled with monomer 320. In addition, because the viscosity of the monomer impacts this method, the temperature at which the methods described herein are practiced are room temperature or approximately from 65 degrees Fahrenheit to 80 degrees Fahrenheit. Other temperatures may be used so long as the temperature is taken into consideration along with the viscosity of the monomer, the elasticity of the membrane and the pressure applied.

The monomer may cure either by means of radical addition, also known as free radical polymerization, or cationic initiation. Multiple kinds of energetic stimuli can be used to polymerize the monomer. The monomer used may be a multifunctional monomer, such as, for example, an acrylic resin. Acrylate and methacrylate are particularly well suited monomers for UV-curing and are commonly used in additive manufacturing. These reactive functional groups, including acrylate and methacrylate groups, can be incorporated in oligomers with polyester, polyurethane, polyurea, etc. Multifunctional monomers that result in an insoluble, infusible, transparent cross-linked network polymer can be used. The monomer may include a blend of photoinitiators or photoactivators to allow for curing of the monomer using UV light. In one embodiment, the photoinitiators included in the monomer are responsive to UV light having a wavelength in the range of from 420 nm to 350 nm.

To cure the monomer while the membrane is applied, the membrane must be translucent or transparent. The membrane must allow UV light used to cure the monomer to pass through it. In some embodiments, the membrane may be permeable to oxygen to some extent. For example, it could be a silicon based membrane. Oxygen inhibits or strongly reduces polymerization by radical addition. This permeability avoids the monomer sticking to the membrane as it is polymerized. The permeability allows for easy removal of the membrane at completion of the methods described herein. In another embodiment, the monomer is epoxidic or capable of cationic initiation. In this embodiment, the membrane material is designed to also avoid sticking to the monomer provided in the gaps between the stepped surface and the membrane.

In one embodiment, according to the methods disclosed herein, a small amount of a monomer used to make all or a part of the lens according to an additive method is deposited on the lens surface to be smoothed. In another embodiment, monomer may be placed on the membrane in addition to or in place of monomer being placed on or applied to the stepped surface of the lens. A film or membrane with adequate elastic properties is pressed against the layered (stepped) surface, with the monomer in between the lens and the membrane. The pressure of the membrane spreads the monomer over the surface of the lens, filling the spaces between the layered (stepped) surface and the membrane. A curing agent, for example, UV light, is applied through the membrane to transition the monomer into a polymer coating, with the surface matching that of the membrane. The membrane is removed, leaving a clean, smooth lens surface. In another embodiment, the monomer is placed on the membrane rather than the lens. In yet another embodiment, a porous membrane is used such that the porous membrane is pressed against the stepped lens surface and the monomer molecules are then forced by pressure (for example, direct pressure or vacuum pressure) to pass through the membrane against and filling the stepped lens surface. A combination of these monomer application techniques may be used.

Figure 4:
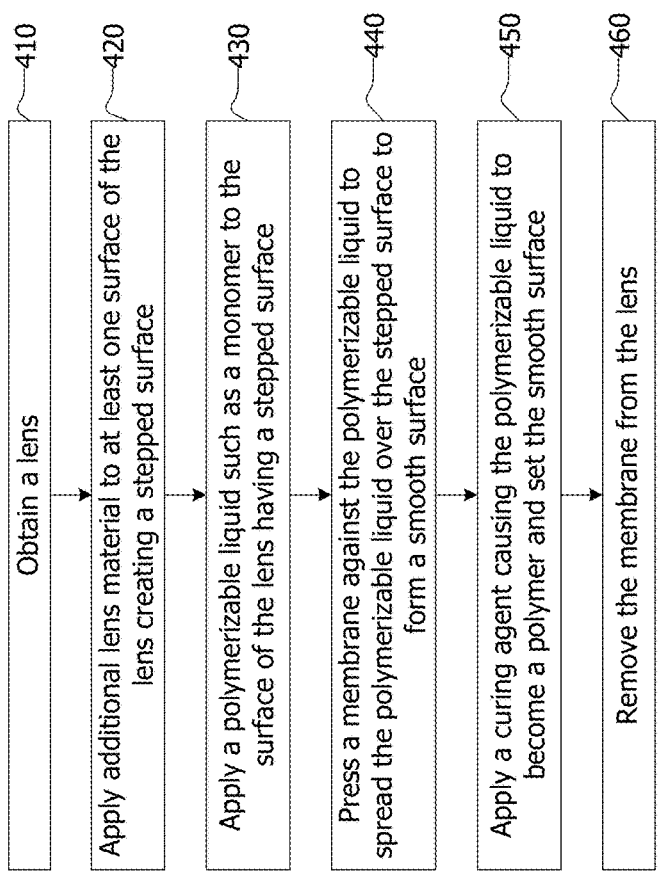
FIG. 4 is a flow chart of a method of smoothing a stepped lens surface.

Referring to FIG. 4, a flow chart of a method of smoothing a stepped lens surface is shown. A lens is obtained, as shown in block 410. The lens may be initially created using an additive process or the lens may have been formed from a solid block (substrate) and augmented or amended using an additive process. Additional lens material (a polymerizable liquid, for example, a monomer) is applied to at least one surface of the lens creating a stepped surface, as shown in block 420. In practice, the additional material is added so that the lens conforms to specified requirement, such as an optical prescription of an eye doctor or optometrist. The additional material is applied according to an additive process such as stereo lithography (SLA). The additional material may be applied using a B9Creator® 3D printer available from B9Creations, LLC of Rapid City, S. Dak. The result is a lens with a stepped or layered surface.

In one embodiment, the method begins with step 430 after the stepped lens has been provided to the practitioner of the method. A polymerizable liquid such as a monomer is applied to the surface of the lens having a stepped surface, as shown in block 430. A membrane is pressed against the polymerizable liquid to spread the polymerizable liquid over the stepped surface to form a smooth surface, as shown in block 440. In another embodiment, the polymerizable liquid may alternatively or additionally be placed on the membrane before the membrane is pressed against the stepped surface of the lens. The polymerizable liquid is a liquid which can be cured to a solid transparent polymer in response to application of UV light or other curing agent. The polymerizable liquid may be a monomer, oligomer, or prepolymer including polyester resin, acrylic ester, acrylic resin, and epoxy resin.

A curing agent is applied causing the polymerizable liquid to become a polymer and set the smooth surface, as shown in block 450. The curing agent may be UV light. To achieve this curing, the polymerizable liquid includes a blend of photoinitiators that, in one embodiment, are responsive to UV light having a wavelength in the range of from 420 nm to 350 nm. The amount of time the UV light is applied to the polymerizable liquid impacts the extent to which the polymerizable liquid is cured. The membrane is removed from the lens, as shown in block 460 with the result being a smooth, clean lens surface, the smoothness conforming to a desired arc or curve.

When curing the polymerizable liquid using UV light, the membranes 330, 530 and 630 (shown and described regarding FIGS. 3, 5 and 6) are transparent, translucent or partially transparent to UV light generally or the specific wavelengths of UV light applied as the curing agent. The membranes 330, 530 and 630 are used at least one time and depending on their formulation may be used until undue wear, dirt, deformation occurs. Silicon membranes, as well as membranes made of PET, nylon and other plastic materials may be used. In some embodiments, the UV light or other curing agent may not fully cure the polymerizable liquid and additional pressure may be applied to the membrane by additional pulling or vacuum pressure (described further below) to further control the final contour of the polymerizable liquid as it solidifies.

Figure 5:
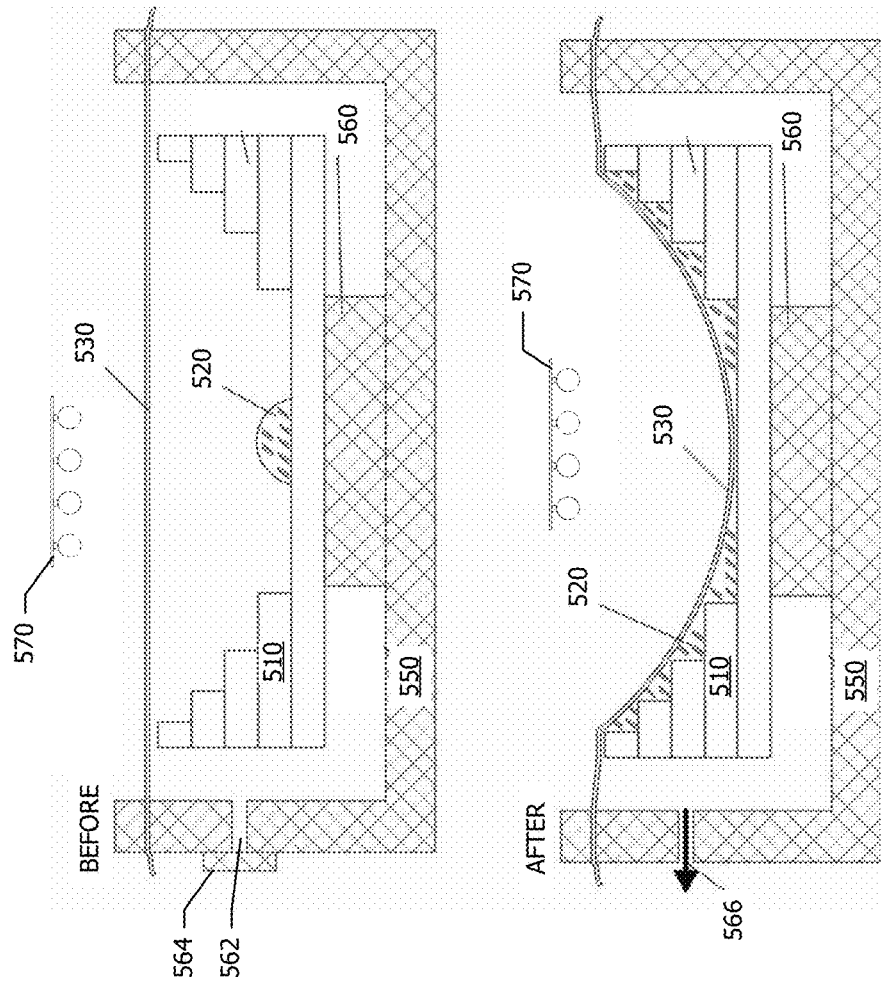
FIG. 5 includes block drawings in profile of an embodiment of a system used in smoothing of a stepped lens surface.

The method described in FIG. 4 may be implemented in various configurations. Referring to FIG. 5, block drawings in profile showing the application of one embodiment of a method of smoothing of a stepped lens surface are shown. In this embodiment, a vacuum is created to pull the membrane against a lens surface causing a monomer to coat and smooth the lens surface. Referring to the BEFORE portion of FIG. 5, a membrane 530 is held uniformly stretched in a support structure, in this example, circular hollow cylinder 550. In various embodiments, the cross section of the membrane support structure 550 may be square, rectangular, round, oval or triangular. The membrane support structure 550 supports the membrane 530 similar to a drum skin or head on a drum (that is, the musical percussion instrument such as a snare drum, kettle drum or bass drum). The cylinder support structure 550 may be made of metal or other suitable strong and resilient material. UV lights 570 which will later serve as a catalyst may be placed in an off state above and/or adjacent to the membrane 530 stretched across the cylinder 550.

Inside the cylinder support structure 550, the layered lens 510 is held on support platform 560 which is coupled to or integrated with the support structure 550. In this embodiment, the concave surface of the lens is placed so that it faces the membrane 530. The cylinder 550 has an output port, evacuation channel or other opening 562 through which air can be extracted to create a vacuum. A pump or other vacuum device (not shown) is coupled to the cylinder 550 and connected to or with the opening 562. A valve, stopper, door or other blocking or closing device 564 is used to open and close the opening 562. The combination of 562 and 564 may be a valve, piston or similar device.

In one embodiment, a quantity of a polymerizable liquid such as a monomer 520 (not shown to scale in the drawing) is deposited on the stepped surface of the lens 510. The monomer 520 is placed on the lens 510 by dropping, dripping, spraying or other technique. The amount and application of the monomer 520 applied to the lens 510 may be computer controlled. In another embodiment, the monomer 520 may alternatively or additionally be placed on the surface of the membrane 530 facing the lens 510. The monomer may be placed on the membrane by spraying, coating or other technique. The amount and application of the monomer applied to the membrane may be computer controlled.

Referring to the AFTER portion of FIG. 5, when the vacuum is activated, a vacuum force is created internal to the cylinder 550. The vacuum force causes the membrane to deform. The amount of pressure of the vacuum in combination with the elastic properties of the membrane 530 and the viscosity of the monomer 520 determine the curvature or arc of the membrane 530. Because the viscosity of the monomer impacts this method, the temperature at which the methods described herein are practiced are room temperature or approximately from 65 degrees Fahrenheit to 80 degrees Fahrenheit. Other temperatures may be used so long as the temperature is taken into consideration along with the viscosity of the monomer, the elasticity of the membrane and the pressure applied. The force of the vacuum pulls the membrane 530 against the monomer coated lens 510 uniformly spreading the monomer 520 over the stepped lens surface as a consequence of the membrane 530 pressing against the monomer 520 on the stepped surface of the lens 510. When a desired amount of pressure is achieved, polymerization of the liquid monomer is initiated using a catalytic energizing technique. In one embodiment UV light is used to cure the monomer 520. The UV lights 570 are turned on to achieve this. The UV lights 570 may have been present and in an off state adjacent to the top of cylinder 550 for the first portion of the process and then placed in an on state after the vacuum pressure has been applied. Alternatively, the UV lights 570 may be put in place and then switched on after the vacuum pressure had been applied. The amount and application of the UV light applied to the monomer may be computer controlled.

Figure 6:
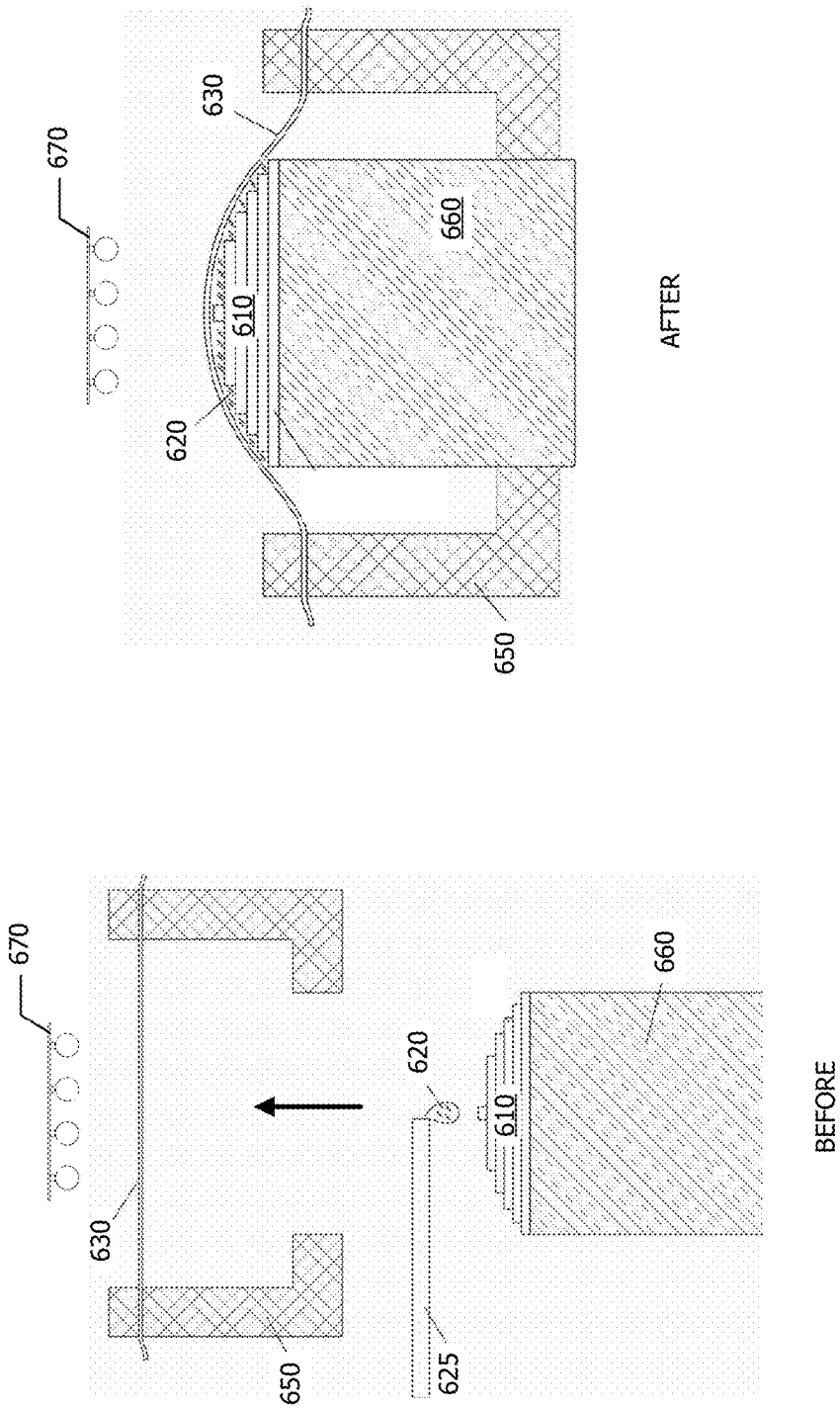
FIG. 6 includes block drawings in profile of an embodiment of a system used in smoothing of a stepped lens surface.

Referring to FIG. 6, block drawings in profile showing the application of one embodiment of a method of smoothing of a stepped lens surface are shown. This embodiment is for applying the smoothing method to a convex surface of a lens. In this embodiment, the stepped surface of lens 610 is convex. Referring to the BEFORE portion of FIG. 6, the lens 610 is placed on a base, support, piston or similar structure shown as lens support piston 660. The piston 660 may be of a shape that corresponds to an opening in a membrane holding structure 650. The membrane support structure 650 may be a tube or hollow cylinder with an opening corresponding in shape and size to allow for entry and removal of the piston 660. The membrane 630 is held in place by the membrane support structure 650. The membrane support structure 650 supports the membrane 630 similar to a drum skin or head on a drum. In various embodiments, the cross section of the membrane support structure 650 may be square, rectangular, round, oval or triangular. Similarly, the cross section of the lens support piston 660 may be square, rectangular, round, oval or triangular with a corresponding opening in the membrane support structure 650. The membrane support structure 650 may be cylindrical in shape and may be made of metal or other suitable strong and resilient material. UV lights 670 in an off state may be placed above and/or adjacent to the membrane 630 stretched across the support structure 650.

A polymerizable liquid such as monomer 620 is placed on top of the stepped surface of the lens 610 it by applying a preferred quantity of the monomer 620 using a dispenser 625. The dispenser 625 may be an automatically operated syringe, a flexible plastic pipe connecting a resin tank with a dripping stainless steel tube, the pipe going through a computer controlled peristaltic pump, or any other controllable drip system. The monomer 620 or other polymerizable liquid may alternatively be applied by spraying or using a spinner. When using a spinning system known to those skilled in the art, the thickness of the deposited monomer coating may be controlled by the angular velocity in combination with the viscosity of the liquid monomer being deposited.

After the monomer 620 is applied to the stepped surface of the lens 610, the lens 610 is moved toward and pressed against membrane 630. In one version of this embodiment, the piston base 660 is moved or slid into a corresponding cavity in the membrane support structure 650. In another version of this embodiment, after the monomer 620 is applied to the stepped surface of the lens 610, the membrane 630 is moved toward and pressed against the lens 610. In this version, the piston base 660 remains stationary while the support structure 650 is pulled or moved down onto lens 610 on the piston 660 so that the membrane is pulled onto the lens 610. In yet another version of this embodiment, both the piston 660 and the support structure 650 may move so that the piston 660 moves toward the membrane 630 stretched across the top of the support structure 650 as the support structure 650 pulls the membrane 630 toward the lens 610. The force of the monomer coated lens against the membrane 630 determines the thickness of the monomer trapped between the stepped surface of the lens 610 and the membrane 630 as shown in the AFTER portion of FIG. 6. The movement of either the lens support 660 and/or the membrane support structure 650 can be achieved by motorized stages, pneumatic cylinders, a vacuum, or other pushing method. The movement of the piston 660 and/or the support structure 650 may be computer controlled.

In the system shown in FIG. 6, the monomer 620 or other polymerizable liquid may be additionally or alternatively applied to a surface of the membrane 630. The monomer or other polymerizable liquid may be placed on the membrane by spraying, coating or other technique. The amount and application of the monomer or other polymerizable liquid applied to the membrane may be computer controlled.

When the membrane is in a preferred location against the stepped lens 610, polymerization of the liquid monomer 620 is begun using a catalytic energizing technique to cure the monomer. In one embodiment UV light is used to cure the monomer 620. The UV lights 670 above and/or adjacent to the membrane 630 are turned on to achieve this. The UV lights 670 may have been present and in an off state adjacent to the top of cylinder 650 for the first portion of the process and then placed in an on state after the membrane 630 is in a preferred location against the stepped lens 610. Alternatively, the UV lights 670 may be put in place and then switched on after the membrane 630 is in a preferred location against the stepped lens 610. The amount and application of the UV light applied to the monomer may be computer controlled.

Figure 7:
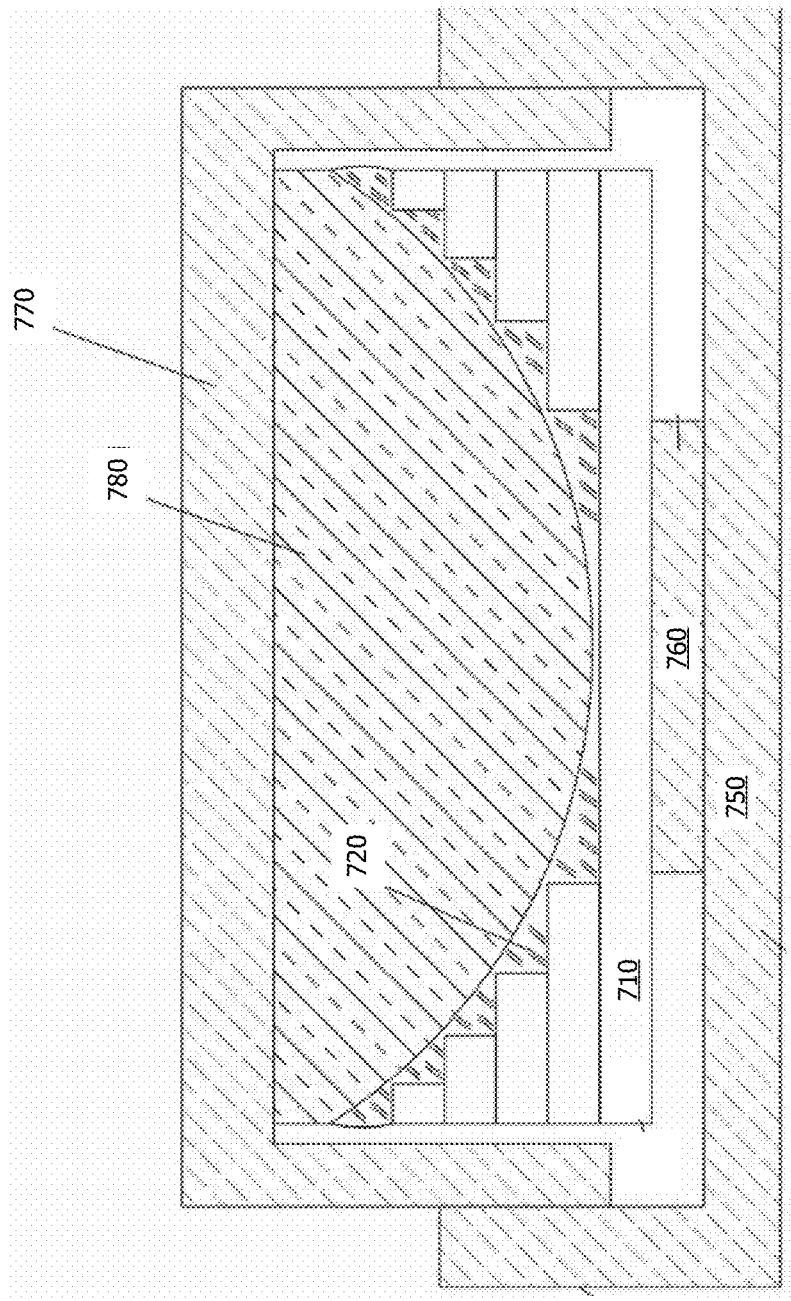
FIG. 7 is a block drawing in profile of an embodiment of a system used in smoothing of a stepped lens surface.

In another embodiment, the membrane discussed above is replaced by a solid mold 780 having a polished surface. Referring to FIG. 7, a block drawing in profile showing the application of another embodiment of a method of smoothing of a stepped lens surface is shown. In this embodiment, a solid mold 780 is used to shape a monomer 720 layer trapped between the mold 780 and the stepped surface of lens 710. This embodiment limits the variation of attainable surfaces to the mold. However, the technique produces whatever surfaces are desired according to the available molds. As shown, like the other methods and systems described above, a support structure 750 having a base 760 holds the lens 710. An amount of monomer 720 or other polymerizable liquid is applied to the stepped surface of the lens. An upper support structure 770 having a mold 780 attached thereto is lowered down toward bottom support structure 750 onto and against the monomer coated lens thus distributing the monomer over the stepped lens to create a smooth arc surface. Alternatively, the base 750 may be moved upward toward a stationary mold 780 held in place by upper support structure 770. The amount of pressure the mold exerts against the monomer coated lens may be computer controlled. Although shown with a stepped concave surface of a lens, this embodiment may be applied to a stepped convex surface of a lens so long as a corresponding concave mold is created and used. The mold 780 may be made from a transparent or translucent material that allows UV light used to cure the monomer to pass through to the monomer between the mold and the lens surface. The support structures 750, 760 and 770 may be made from glass, metal, plastic resin or other suitable material. In addition, in some embodiments, the mold may be partially deformable, so that the mold does not perfectly (or exactly) match the ideal final surface, until the mold deforms under pressure against the stepped surface to conform to the ideal final surface arc.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, that is, to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for improving a lens manufactured by a 3D printing process, the lens with a first surface having a stepped surface having errors such that the lens is not entirely smooth, the method comprising:
   applying a polymerizable liquid to the first surface of the lens, the polymerizable liquid covering the stepped surface of the lens
   pressing a membrane against the polymerizable liquid to spread the polymerizable liquid over the stepped surface of the first side of the lens to form a smooth surface
   applying a curing agent to the first side of the lens while the membrane is pressed against the first surface of the lens to cause the polymerizable liquid to become a polymer and set the smooth surface to cure the errors caused by the stepped surface and improve conformance to an optical prescription
   removing the membrane from the lens.

2. The method of claim 1 wherein the polymerizable liquid is a monomer.

3. The method of claim 2 wherein the monomer comprises acrylic ester.

4. The method of claim 1 wherein the polymerizable liquid is one selected from the group including monomers, oligomers, polyester resins, acrylic esters, acrylic resins, and epoxy resins.

5. The method of claim 1 wherein the polymerizable liquid includes a blend of photoinitiators.

6. The method of claim 5 wherein the photoinitiators are responsive to UV light having a wavelength in the range of from 420 nm to 350 nm.

7. The method of claim 1 wherein the membrane is partially elastic.

8. The method of claim 1 wherein the membrane is silicon based.

9. The method of claim 1 wherein the membrane is permeable to oxygen.

10. The method of claim 1 wherein the pressing is achieved so the membrane does not contact the lens.

11. The method of claim 1 wherein the pressing to form the smooth surface conforms to a desired curve of the smooth surface.

12. The method of claim 1 wherein the curing agent is UV light.

13. The method of claim 1 wherein applying a curing agent causes radical addition or cationic initiation.

14. The method of claim 1 wherein the first surface is a concave surface of the lens.

15. The method of claim 1:
   wherein the first surface is a convex surface of the lens
   wherein the pressing comprises:
      suspending the membrane in a cylinder
      moving the lens toward the suspended membrane so that the membrane contacts the polymerizable liquid, the moving continuing until a desired stress on the membrane is reached and then ceasing.

16. The method of claim 1 wherein the pressing comprises:
   suspending the membrane toward the top of an air-tight support structure placing the lens on lens support inside the support structure and below the suspended membrane such that the first surface of the lens is facing the membrane evacuating air from the support structure causing negative pressure to pull the membrane against the polymerizable liquid on the first surface of the lens.

17. The method of claim 16 wherein the evacuating is achieved through an opening in the support structure.

18. The method of claim 1 further comprising:

suspending the membrane toward the top of a support structure placing the lens on a piston below the membrane wherein the pressing includes moving the piston toward the suspended membrane so that the membrane contacts the polymerizable liquid, the moving continuing until a desired stress on the membrane is reached and then ceasing the moving.

19. The method of claim 1 further comprising:

suspending the membrane toward the top of a support structure placing the lens on a piston below the membrane wherein the pressing includes moving the support structure down toward the suspended lens so that the membrane contacts the polymerizable liquid, the moving continuing until a desired stress on the membrane is reached and then ceasing the moving.

20. A method for improving a lens manufactured by a 3D printing process comprising:

applying additional lens material to a first surface of the lens using an additive process, the applying causing the first surface to have a stepped surface such that the first surface of the lens is not entirely smooth and has mechanical and/or geometrical errors applying a monomer to the first surface of the lens, wherein the monomer is acrylic ester and comprises a blend of photoinitiators responsive to UV light having a wavelength in the range of from 420 nm to 350 nm pressing a membrane against the monomer to spread the monomer over the stepped surface of the first surface of the lens to form a smooth surface applying UV light as a curing agent to the first surface of the lens while the membrane is pressed against the monomer spread over the first surface of the lens, the applying UV light to cause the monomer to become a polymer and set the smooth surface and cure the mechanical and/or geometrical errors and improve conformance to an optical prescription removing the membrane from the lens.

21. A method for improving a lens manufactured using a 3D printing process, the method comprising:

applying additional lens material to a first lens surface of the lens using an additive process, the applying causing the first lens surface to have a stepped surface such that the first lens surface is not entirely smooth and has mechanical and/or geometrical errors applying a monomer to a first surface of a membrane, wherein the monomer is acrylic ester and comprises a blend of photoinitiators responsive to UV light having a wavelength in the range of from 420 nm to 350 nm pressing the membrane against the first lens surface of the lens to spread the monomer over the stepped surface of the lens to form a smooth surface applying UV light as a curing agent to the first lens surface while the membrane is pressed against the first lens surface to cause the monomer to become a polymer and set the smooth surface to cure the mechanical and/or geometrical errors and improve conformance to an optical prescription removing the membrane from the lens.

* * * * *